United States Patent
Wu Chang

(10) Patent No.: US 8,210,101 B2
(45) Date of Patent: Jul. 3, 2012

(54) SAFETY DEVICE FOR JUICE EXTRACTOR

(75) Inventor: Li-Chen Wu Chang, Taoyuan Hsien (TW)

(73) Assignee: Lyu Jan Co., Ltd., Taoyuan Hsien (TW)

( * ) Notice: Subject to any disclaimer, the term of this patent is extended or adjusted under 35 U.S.C. 154(b) by 543 days.

(21) Appl. No.: 12/331,280

(22) Filed: Dec. 9, 2008

(65) Prior Publication Data

US 2010/0139504 A1 Jun. 10, 2010

(51) Int. Cl.
*B02C 15/00* (2006.01)

(52) U.S. Cl. ............................................. 99/510; 99/337

(58) Field of Classification Search ................... 99/510, 99/509, 495, 485, 337; 366/206; 100/51, 100/52, 98 R
See application file for complete search history.

(56) References Cited

U.S. PATENT DOCUMENTS

| | | | | | |
|---|---|---|---|---|---|
| 3,108,533 | A | * | 10/1963 | Read et al. | 100/98 R |
| 4,113,188 | A | * | 9/1978 | Belinkoff | 241/37.5 |
| 4,216,917 | A | * | 8/1980 | Clare et al. | 241/37.5 |
| 4,226,373 | A | * | 10/1980 | Williams | 241/37.5 |
| 4,297,038 | A | * | 10/1981 | Falkenbach | 366/206 |
| 4,335,860 | A | * | 6/1982 | Grandel et al. | 241/37.5 |
| 4,371,118 | A | * | 2/1983 | Sontheimer et al. | 241/30 |
| 4,540,128 | A | * | 9/1985 | Breeden | 241/37.5 |
| 4,614,306 | A | * | 9/1986 | Doggett | 241/37.5 |
| 4,623,097 | A | * | 11/1986 | Sontheimer | 241/37.5 |
| 4,629,131 | A | * | 12/1986 | Podell | 241/36 |
| 5,035,174 | A | * | 7/1991 | Seal, Jr. | 100/52 |
| 5,355,784 | A | * | 10/1994 | Franklin et al. | 99/492 |
| 6,513,966 | B1 | * | 2/2003 | Gort-Barten et al. | 366/205 |
| 6,540,394 | B2 | * | 4/2003 | Juriga | 366/205 |
| 6,568,843 | B1 | * | 5/2003 | Lai | 366/206 |
| 6,609,821 | B2 | * | 8/2003 | Wulf et al. | 366/206 |
| 6,629,492 | B1 | * | 10/2003 | Li | 99/337 |
| 6,776,086 | B1 | * | 8/2004 | Chang Chien | 99/492 |
| 6,910,800 | B2 | * | 6/2005 | Wu | 366/199 |
| 7,047,872 | B2 | * | 5/2006 | Mulle | 99/337 |
| 7,278,779 | B2 | * | 10/2007 | Beesley et al. | 366/205 |
| 7,407,320 | B1 | * | 8/2008 | Lin | 366/206 |
| 2007/0056450 | A1 | * | 3/2007 | Hensel | 99/495 |
| 2008/0163767 | A1 | | 7/2008 | Wu Chang | |

\* cited by examiner

*Primary Examiner* — Gene Kim
*Assistant Examiner* — M Chambers
(74) *Attorney, Agent, or Firm* — Rabin & Berdo, P.C.

(57) ABSTRACT

A safety device for a juice extractor includes a switch unit connected to an outside of the feed channel and electrically connected to a power source of the motor. A collar is movably mounted to the feed channel and includes an insertion which is inserted into an opening in a handle of the juice extractor so as to activate the switch unit to drive the motor and the blade disc. When the collar is moved away from the handle, the insertion is removed from the switch such that the motor and the blade disc are stopped to ensure the safety for the users.

8 Claims, 6 Drawing Sheets

SAFETY DEVICE FOR JUICE EXTRACTOR

BACKGROUND OF THE INVENTION

1. Field of the Invention

The present invention relates to a safety device for a juice extractor, and more particularly, to a safety device that can protect the safety of users.

2. The Prior Arts

The vegetable and juice extractors in the market nowadays usually have a feed channel with a food pusher. The food pusher pushes fruits or vegetables down the feed channel and presses them against a blade disk at the bottom. Thus the fruits or vegetables are chopped and ground into juice.

A power switch controls a motor of the conventional juicer. In other words, when the power switch is turned on, the motor drives the blade disc to rotate continuously; whereas, when the power switch is turned off, the motor and the blade disc stop rotating. This kind of juice extractor has many disadvantages. When the food pusher is away from the feed channel and next piece of fruit isn't pushed in, the blade disc is still rotating. If a foreign object is dropped in the feed channel, a severe impact between the blade disc and the foreign object may happen and the blade disc is likely to be damaged. The object may even be thrown out of the extractor to injure people. Although the user can turn off the power before the food pusher is taken out of the feed channel and turn on the power again after the food pusher pushes another fruit down the feed channel, it is bothersome to switch on and off repeatedly.

Another conventional juice extractor without food pusher also possesses the similar safety problem. Especially a juice extractor with a large opening may cause a danger to kids who may stick their hands down the unit.

U.S. patent application Ser. No. 11/620,801 discloses an improved juice extractor which includes a switch in the feed channel and the switch is activated when the pusher is in contact with the switch. However, the position that the switch is located may make the food be easily contaminated by the switch and the circuit of the switch may also be short by the juice. Furthermore, the switch is difficult to access and this increases difficulty for maintenance. The switch is activated by the food pusher when the food pusher is inserted to a certain depth in the feed channel. The switch stops when the food pusher is removed from the feed channel. The users cannot control the operation of the motor conveniently because the food pusher has to be inserted into the feed channel a certain depth.

SUMMARY OF THE INVENTION

A primary objective of the present invention is to provide a juice extractor that is safe to the users and the motor and the blade disc can be operated according to the users' needs.

A juice extractor according to the present invention comprises a switch unit located on an outside of the feed channel and a collar movably mounted to the pusher unit. When the pusher unit is inserted into the feed channel, the switch unit is activated by the collar rather than by the pusher unit so that the switch unit does not contaminate the food.

The collar of the juice extractor has proper weight and moves downward along the pusher unit when the pusher unit is inserted into the feed channel to activate the motor and the blade disc. When the pusher unit is removed from the feed channel, the collar can be moved upward to stop the motor and the blade disc or the collar can be kept at the position to keep the motor and the blade disc operation.

A switch unit is connected to an outside of the feed channel and electrically connected to a power source of the motor. A collar with proper weight is movably mounted to the feed channel and includes an insertion which is inserted into an opening in the handle so as to activate the switch unit to drive the motor and the blade disc. The collar may include an object therein to increase its weight. When the collar is moved away from the switch unit, the insertion is removed from the switch such that the motor and the blade disc are stopped to ensure the safety for the users.

A handle is connected to an outside of the feed channel and the switch unit is located in the handle. An opening is defined in a top of the handle and the switch unit protrudes into the opening so as to be touched by the insertion of the collar.

The switch unit in the handle includes a limit switch and a link which protrudes into the opening and is in contact with the limit switch to activate the motor and the blade disc.

If it is needed to keep the blade disc to operate continuously, the pusher unit includes a passage defined axially therethrough and a pusher is removably inserted in the passage so that the food can be fed into the passage and pushed toward the blade disc by the pusher.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
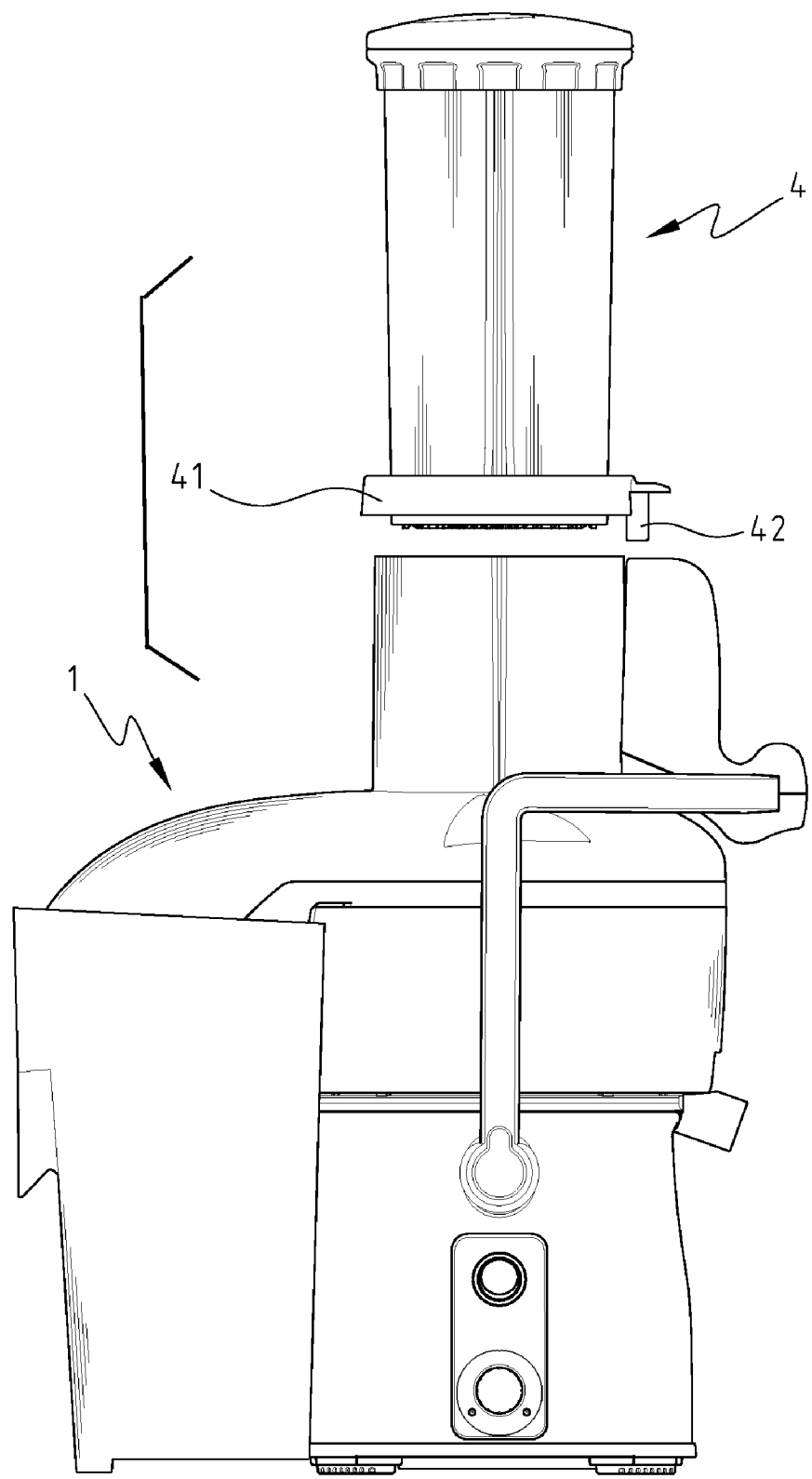
FIG. 1 is a side view showing a juice extractor in accordance with the present invention.
Figure 3:
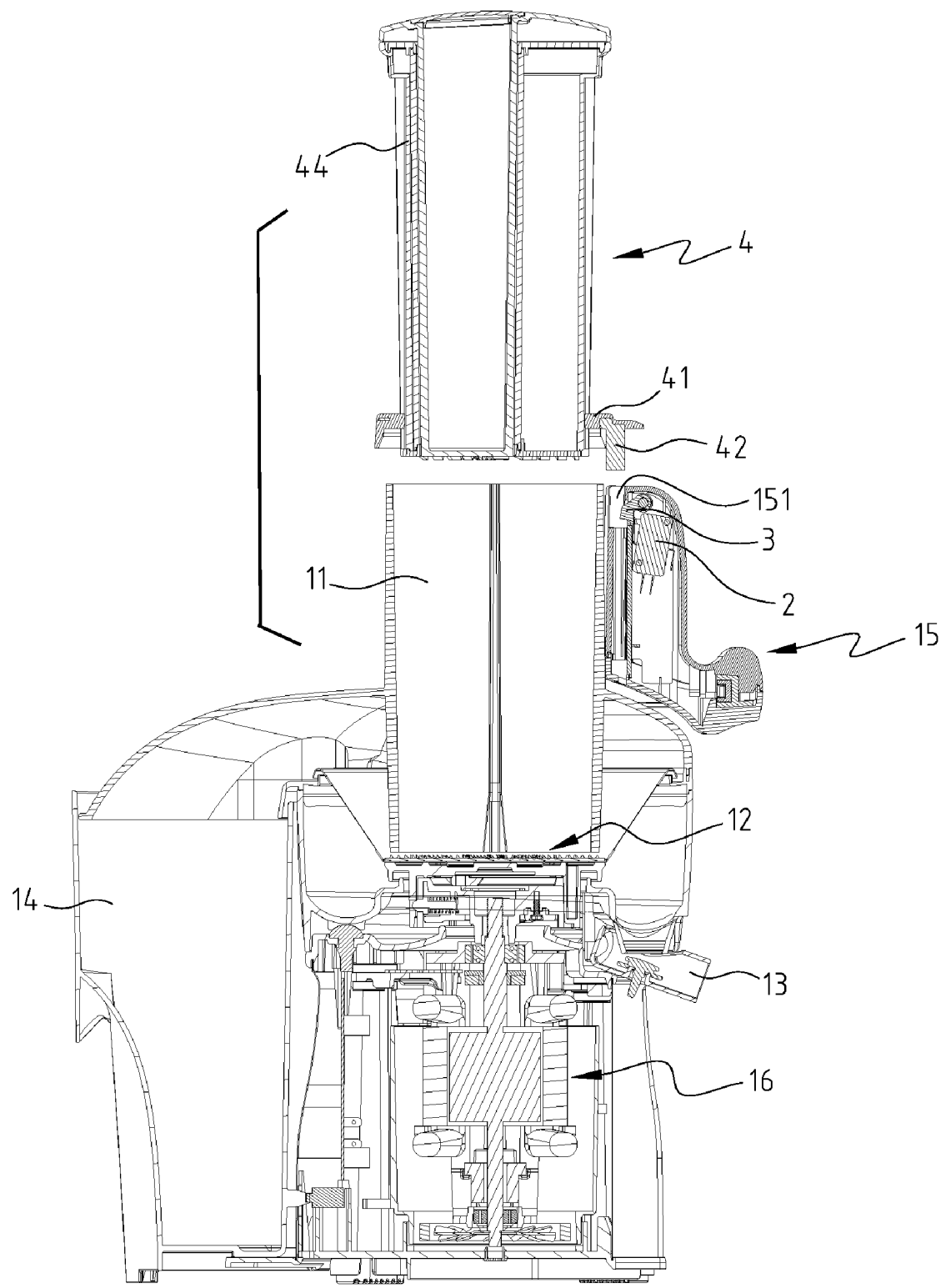
FIG. 3 is a cross sectional view of the juice extractor in accordance with the present invention.

With reference to the drawings and in particular to FIGS. 1 and 3, a juice extractor in accordance with the present invention comprises a main body 1 and a pusher unit 4, wherein the main body 1 includes a motor 16 received therein and a feed channel 11 is located on a top of the main body 1. A blade disc 12 is located at a lower end of the feed channel 11 and driven by the motor 16. Food such as fruit and vegetable can be fed into the feed channel 11 and ground by the blade disc 12 when the motor 16 is in operation. The juice can be collected from an outlet 13 on a side of the juice extractor and the debris can be collected into a debris box 14.

Figure 3A:
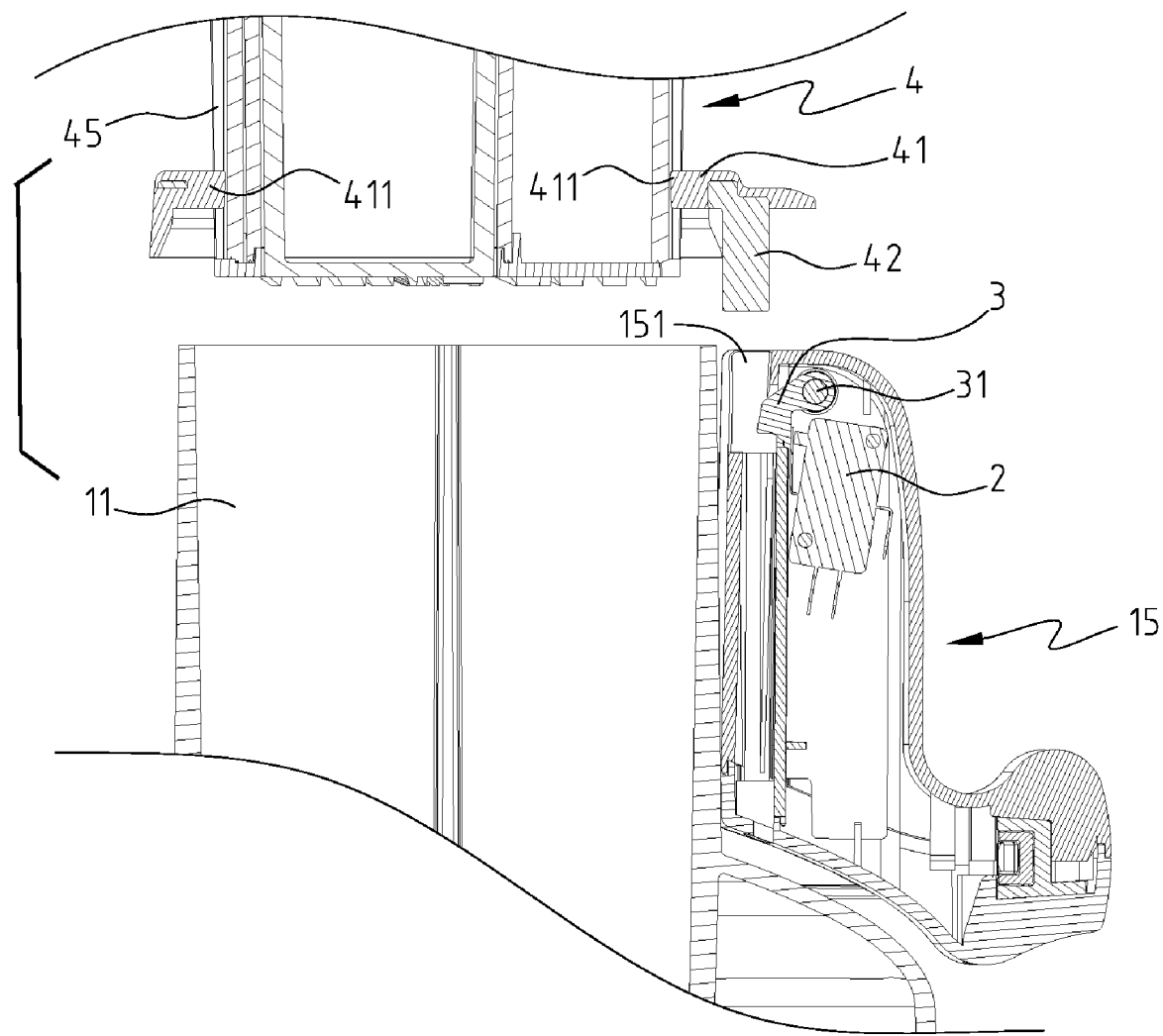
FIG. 3A is a locally enlarged cross sectional view showing a handle and a collar on the pusher unit of the juice extractor in accordance with the present invention.

With reference to FIGS. 3 and 3A, a handle 15 is connected to the main body 1 and located beside the feed channel 11. An opening 151 is defined in a top of the handle 15 and a switch unit is located in the handle 15 and includes a limit switch 2 and a link 3 which is pivotably connected to the handle 15 by a pivot 31 and in contact with the limit switch 2. A part of the link 3 is located within the opening 151 and the switch unit is electrically connected to the power source of the motor 16.

Figure 2:
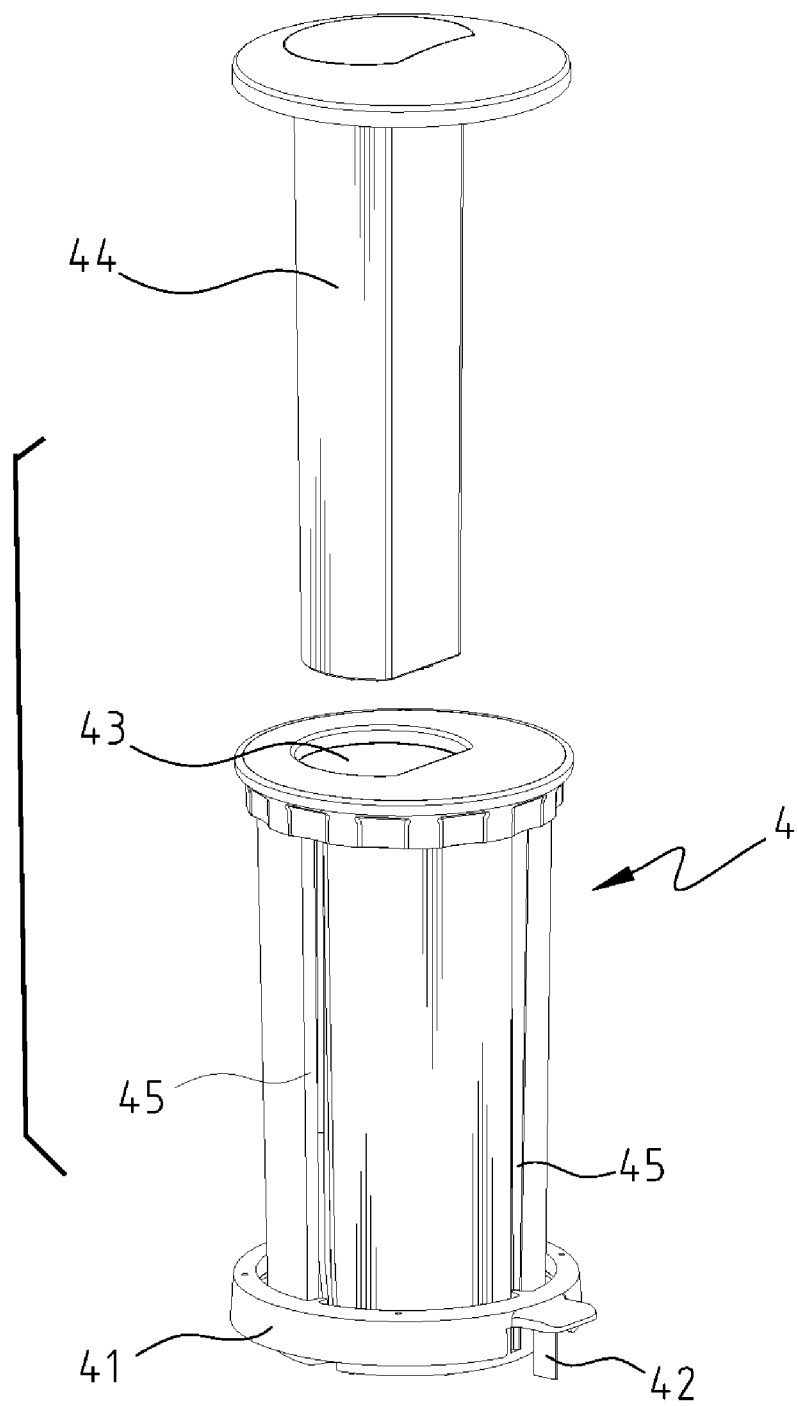
FIG. 2 is an exploded perspective view showing a pusher unit of the juice extractor in accordance with the present invention.

With reference to FIGS. 2 and 3A, the pusher unit 4 has a passage 43 defined axially therethrough and a pusher 44 is removably inserted in the passage 43. Multiple axial grooves 45 are defined in an outside of the pusher unit 4. A collar 41 is movably mounted to the pusher unit 4 and includes multiple blocks 411 which are slidably engaged with the grooves 45. An insertion 42 extends from the collar 41. The collar 41 may have a proper weight such as a metal weight received therein so as to increase the weight of the collar 41. The collar 41 can also be made by any material that has a certain weight.

Figure 3B:
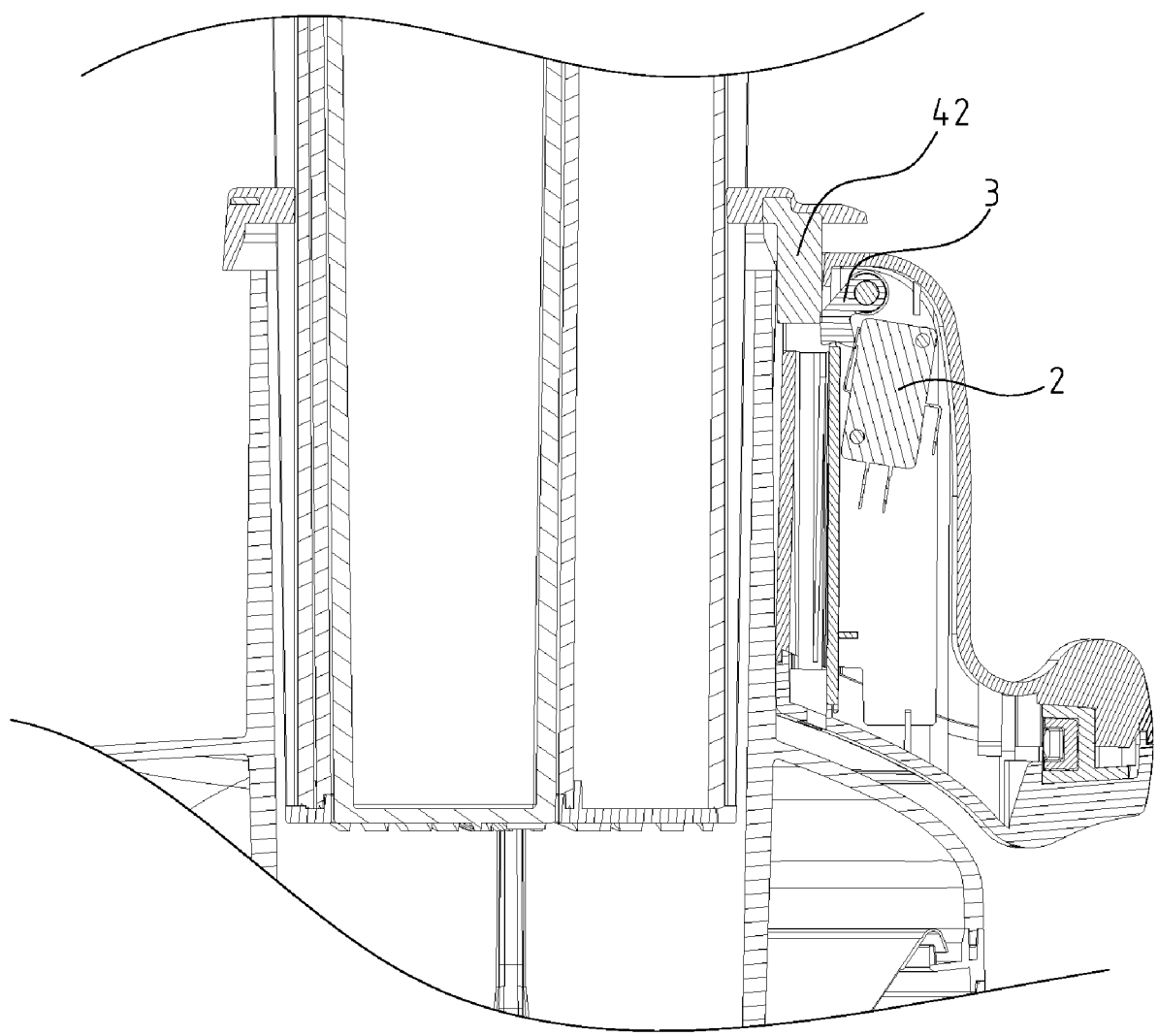
FIG. 3B is a locally enlarged cross sectional view showing that a switch unit is activated by an insertion on the collar when the pusher unit is inserted into a feed channel of the juice extractor.
Figure 3C:
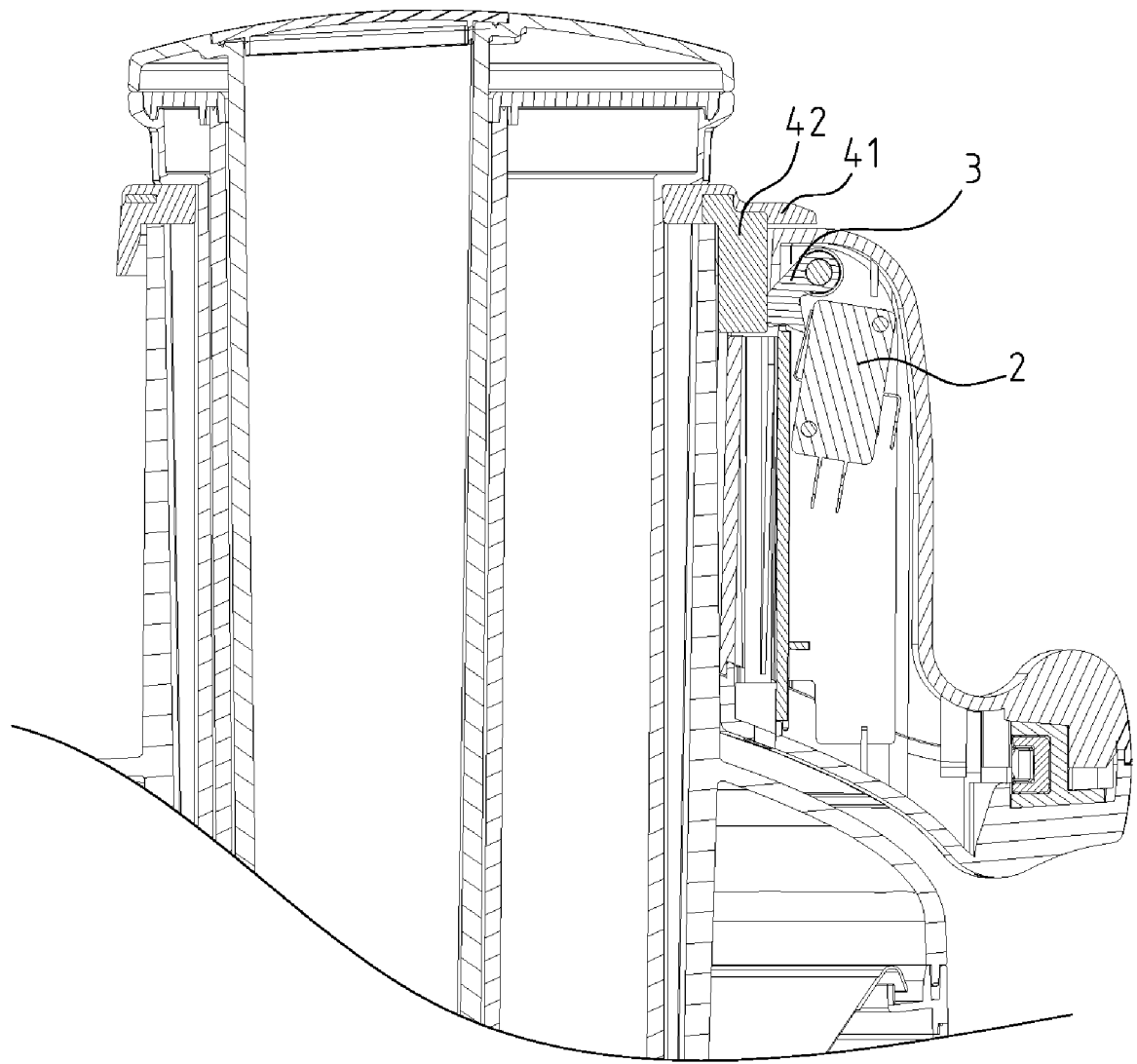
FIG. 3C is a locally enlarged cross sectional view showing that the switch unit is activated by the insertion on the collar when the pusher unit is completely inserted into the feed channel.

When using the juice extractor, the fruit and vegetable are thrown into the feed channel 11 and the pusher unit 4 is inserted into the feed channel 11. The collar 41 is located at the lower part of the pusher unit 4 due to its weight and the insertion 42 is then inserted into the opening 151 of the handle 15 when pushing the pusher unit 4 along the feed channel 11. As shown in FIG. 3B, the link 3 is pushed by the insertion 42 so as to activate the limit switch 2 and the motor 16 is operated to drive the blade disc 12 as shown in FIG. 3C to grind the fruit and vegetable. The user can also hold the collar 41 and push the pusher unit 4 first to move the fruit and vegetable into the feed channel 11. The collar 41 is then released to activate the motor 16 and the blade disc 12 when needed. When removing the collar 41 upward to let the insertion 42 remove from the opening 151, the limit switch 2 pushes the link 3 back and the limit switch 2 is then stopped. There are two ways to move the collar 41 upward, one is to move the collar 41 together with the removal of the pusher unit 4 to stop the motor 16 and the blade disc 12, the other way is to lift the pusher unit 4 only and the collar 41 is then lifted when needing to keep the blade disc 12 rotation while the pusher 4 is lifted.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A juice extractor, comprising
   a main body having a motor received therein and a feed channel located on a top of the main body, a blade disc located at a lower end of the feed channel and driven by the motor;
   a switch unit connected to an outside of the feed channel and electrically connected to a power source of the motor;
   a pusher unit;
   a collar movably mounted to the pusher unit; and
   an insertion extending from the collar, the insertion being in an engagement position when the insertion is in contact with the switch unit and being in a removal position when the insertion is removed from the switch unit, the pusher unit being movably inserted into the feed channel to activate the motor and the blade disc when the insertion is in the engagement position, the motor being stopped when the insertion is in the removal position, the collar being independently movable so that the insertion switches between the engagement position and the removal position,
   wherein the insertion is moved from the removal position to the engagement position so as to activate the motor and the blade disc by moving the pusher unit relative to the collar wherein the collar is independently movable in the same direction as the pusher unit and is movably inserted into or removed from the feed channel.

2. The juice extractor as claimed in claim 1, wherein a handle is connected to the main body and the switch unit is located in the handle, an opening is defined in a top of the handle and the switch unit protrudes into the opening such that the insertion contacts with the switch unit.

3. The juice extractor as claimed in claim 2, wherein the switch unit includes a limit switch and a link which is in contact with the limit switch, a part of the link is located within the opening.

4. The juice extractor as claimed in claim 1, wherein the pusher unit includes a pusher and a passage defined axially therethrough, the pusher being removably inserted in the passage.

5. The juice extractor as claimed in claim 1, wherein at least one axial groove is defined in an outside of the pusher unit and the collar includes at least one block which is slidably engaged with the at least one groove.

6. The juice extractor as claimed in claim 1, wherein the pusher unit is moved to activate the motor and the blade disc in an axial direction of the pusher unit.

7. The juice extractor as claimed in claim 6, wherein the axial direction is vertical.

8. The juice extractor as claimed in claim 7, wherein the pusher unit is moved downward to activate the motor and the blade disc.

* * * * *